T. FAWCUS.
GEAR CUTTING MACHINE.
APPLICATION FILED MAR. 11, 1911.
1,022,667.
Patented Apr. 9, 1912.
4 SHEETS—SHEET 3.
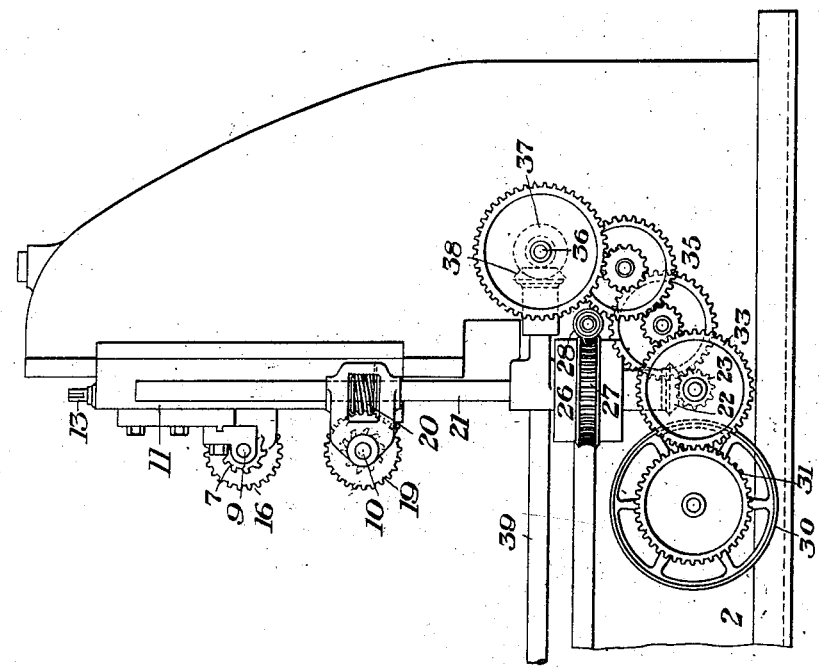
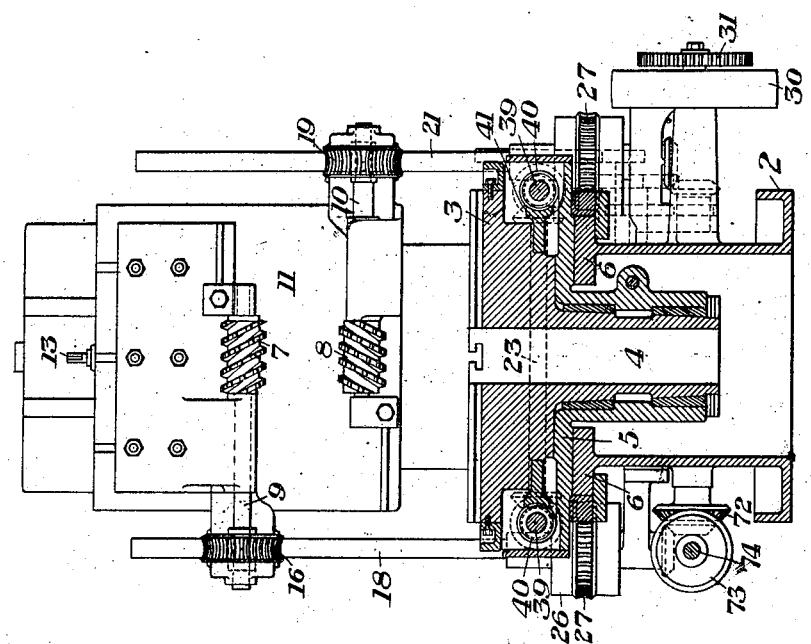
WITNESSES
R A Balderson
W Famariss
INVENTOR
Thos. Fawcus,
by Bakewell, Byrnes & Parmelee,
his Attys.

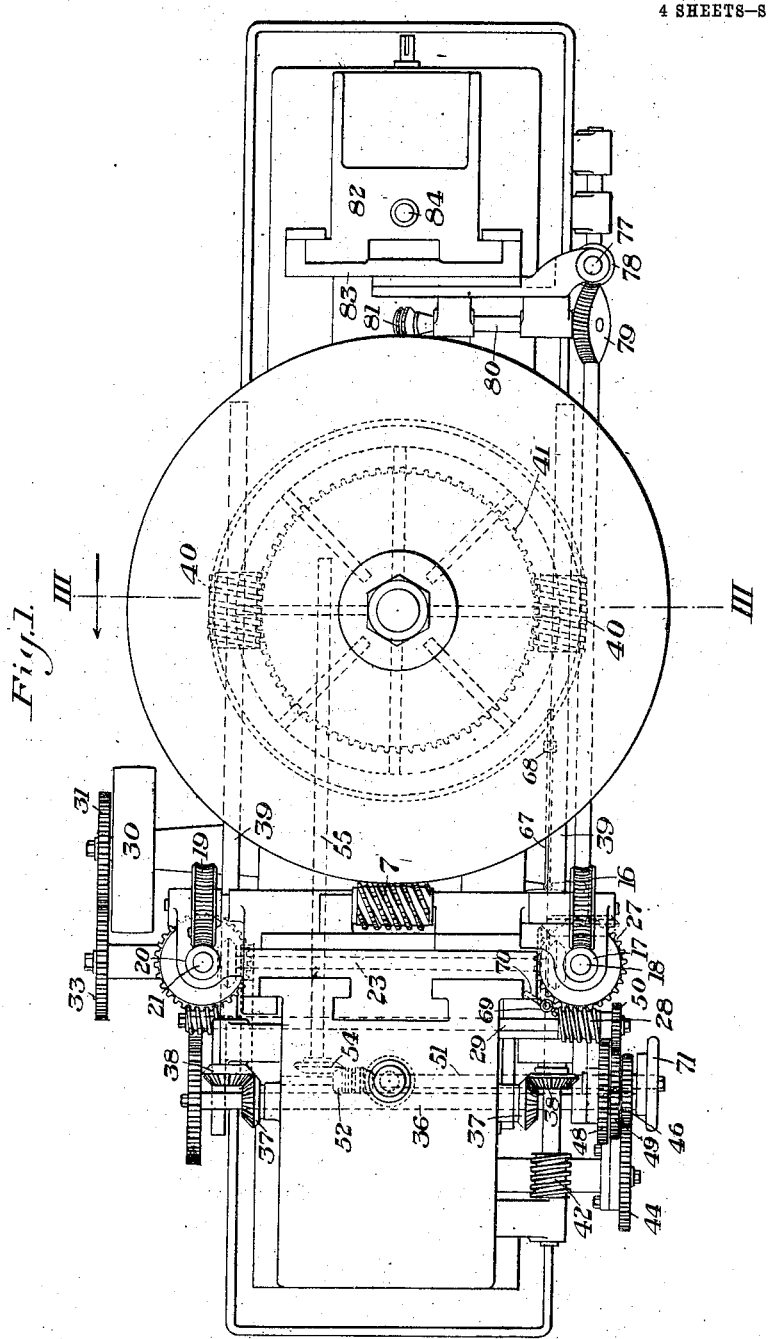

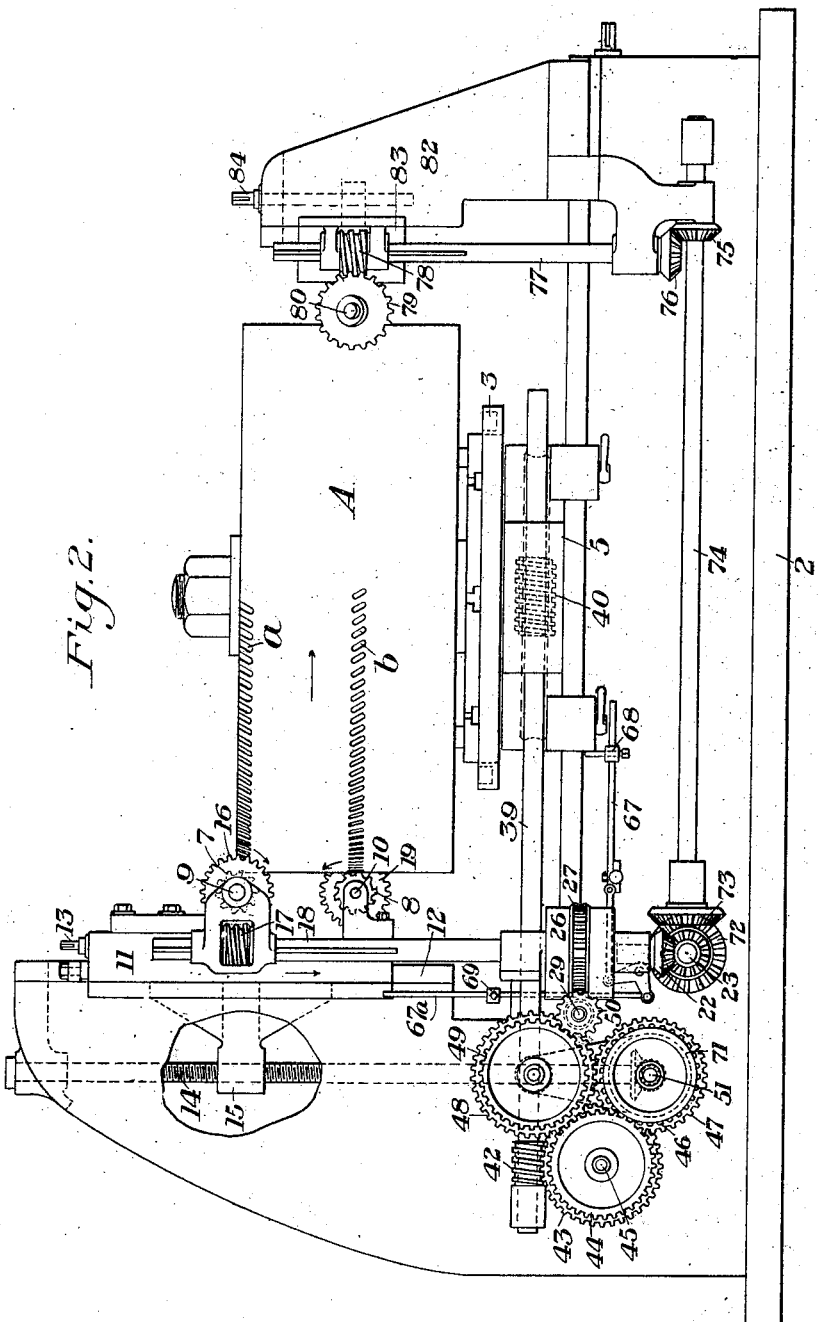

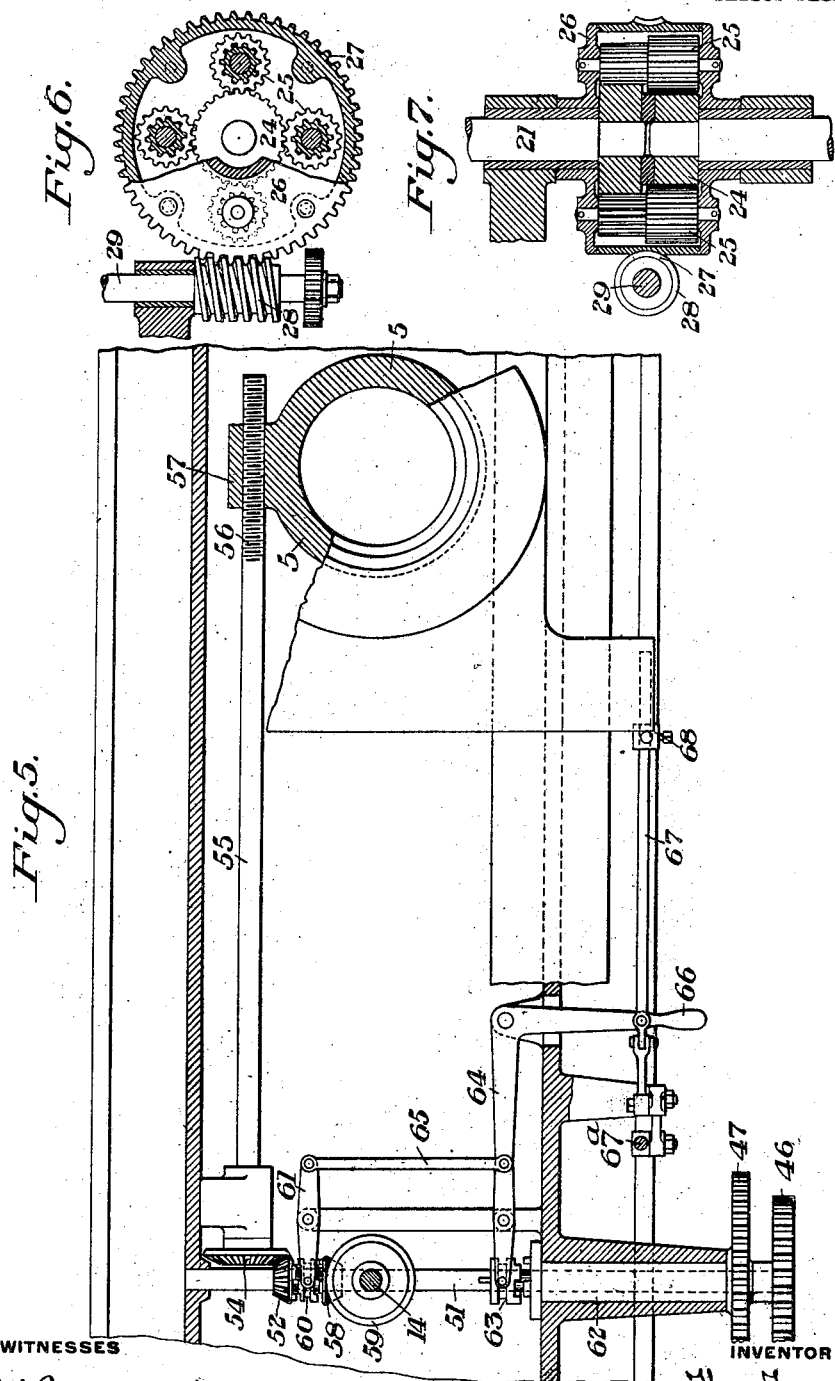

UNITED STATES PATENT OFFICE.

THOMAS FAWCUS, OF PITTSBURGH, PENNSYLVANIA.

GEAR-CUTTING MACHINE.

1,022,667.    Specification of Letters Patent.    Patented Apr. 9, 1912.

Application filed March 11, 1911. Serial No. 613,885.

*To all whom it may concern:*

Be it known that I, THOMAS FAWCUS, of Pittsburgh, Allegheny county, Pennsylvania, have invented a new and useful Improvement in Gear-Cutting Machines, of which the following is a full, clear, and exact description, reference being had to the accompanying drawings, forming part of this specification, in which—
Figure 1 is a plan view of a machine embodying my invention; Fig. 2 is a side elevation of the same; Fig. 3 is a transverse vertical section taken on the line III—III of Fig. 1, and looking in the direction of the arrow; Fig. 4 is a side elevation of a portion of the machine, taken at the opposite side from Fig. 2; Fig. 5 is a sectional plan of a portion of the machine; and Figs. 6 and 7 are detail sectional views showing the differential gearing.

My invention has relation to gear cutting machines, and more particularly to a machine for cutting gears of the type commonly known as "double-helical" gears.
The object of my invention is to provide a machine of this character by means of which gears of this type may be accurately cut with comparative rapidity.

My invention provides a machine having two cutting hobs arranged to act simultaneously upon the gear blank, one hob cutting the portions of the double helical teeth at one side of the peripheral center of the blank, and the other hob cutting the teeth at the opposite side of the center, together with means for feeding both hobs in the same direction while cutting. It also provides means for affecting the cutters to cause them to produce cuts which are at reverse angles to the axis of the blank in which the cuts are being made. It also provides means for forming clearance spaces, when desired, at the apices of the teeth of the character described and claimed in my Patent No. 971,980 of October 4th, 1910. It also provides a machine having certain novel operating mechanisms.

Referring to the accompanying drawings, the numeral 2 designates the bed frame of the machine, which may be of any suitable character.

3 designates a rotary blank supporting table, which is mounted to rotate in a horizontal plane upon the vertical shaft 4, which is mounted in a carriage 5 movable longitudinally on the bed of the machine on the ways 6.

A designates a partially cut blank, which I have shown as rigidly secured to the table 3 in any suitable manner, and which is to have double helical teeth cut thereon. I have indicated at $a$ and $b$ the beginnings of the two sets of teeth. The teeth $a$ extending from the upper edge of the blank to the center line of the periphery, are cut by a rotary hob 7, while the teeth $b$ which extend from the lower edge of the blank to the center, are cut by the hob 8. These two hobs are of well known character, having helical cutting teeth, which mesh with the teeth which they cut in the blank, one of the hobs being right-handed and the other left-handed. The hob 7 is mounted upon a transverse shaft 9, while the hob 8 is mounted on a transverse shaft 10, these two shafts being journaled one above another in suitable bearings on a vertically movable slide or carrier 11, which works on the vertical ways 12. Provision is also made as indicated at 13, whereby the bearings for the shaft 9 may be adjusted to vary the distance between the centers of the two shafts 9 and 10 to suit different sized gear blanks.

The slide or carrier 11 is given its feed movement by the vertical feed screw 14, which engages a nut portion 15 of the slide or carriage. The hob shaft 9 has at one end a worm wheel 16, which is engaged and driven by a worm 17 on a vertical shaft 18 at one side of the machine. The hob shaft 10 has a similar worm wheel 19 at the opposite side of the machine driven by a worm 20 on the vertical shaft 21.

Each of the shafts 18 and 21 is formed in sections, as best shown in Fig. 7, the two sections of each shaft being connected through a differential or planetary gear device, presently to be described, and the lower section of each shaft having bevel gear engagement 22 with a transverse driving shaft 23, this bearing being so arranged that the two shafts 18 and 21 are driven in opposite directions so that the two hobs will be driven in the opposite directions indicated by the arrows on Fig. 2.

Any suitable form of differential or planetary gear may be employed for connecting the sections of the shafts 18 and 21. In the drawings, I have shown a form of this gear in which the end of each shaft section has secured thereto a gear 24. These gears engage pinions 25, mounted in a casing 26 having external worm teeth 27 arranged to be engaged by a worm 28 on a transverse shaft 29. With the shaft 29 stationary, the shaft 23 will drive the shafts 18 and 21 at the same rate of speed, the two differential gears at opposite sides of the machine being of the same arrangement, and the gears 24 and pinions 25 transmitting the movement of the lower shaft sections to the upper shaft sections without changing the rate of speed. When, however, the shaft 29 is actuated to cause the worm wheels 28 to rotate, the casings 26 will be rotated, and will thereby change the rate of rotation of the upper shaft sections relatively to the lower shaft sections; and by reason of the fact that the two shafts 18 and 21 are rotated in opposite directions, it will be seen that one of the hob shafts will be rotated at a relatively higher speed, while the other will be rotated at a relatively lower speed so long as the shaft 29 is turning.

It is well known that in cutting helical or spiral gears, in order to produce teeth of the proper angle and pitch, there must, while the cutter is being fed across the face of the blank, be some provision made for relative movement of the blank carrier and the cutter at a speed different from that which would be imparted, supposing either the blank or the cutter were rotated by its engagement with the other.

It will be apparent that inasmuch as the two hobs or cutters 7 and 8 are working simultaneously upon the blank, and each forming one-half of a double helical tooth, that the relative speeds of the two cutters with respect to the blank must be varied, and that it is manifestly impossible to get the necessary variation by changing the speed of the blank relatively to the cutters, since all portions of the blank must rotate at the same speed. It is for this reason that the differential gears above described are provided. These differential gears act to drive the hob or cutter 7 at a speed relatively slower than that of the blank and to drive the hob or cutter 8 at a speed relatively greater than that of the blank, or vice versa, according to the direction of the rotation of the blank and cutters, whereby the proper angle and pitch of teeth is produced. Inasmuch as the angle and pitch of the teeth may vary for different gears, provision is preferably made for driving the worms 27 at different speeds. Various change gear mechanisms may be employed for this purpose. Various forms of gearing may also be provided for driving the transverse shaft 23 and the feed screw 14. The particular gearing which I have illustrated, and which will now be described, will be understood to be illustrative only, and to form no essential part of my invention.

30 (see Figs. 1 and 4) designate a belt pulley, which forms the main drive of the machine. The shaft of this pulley carries the gear wheel 31, which, through the gear 33, drives the shaft 23, and through the train of gears 35, drives the shaft 36. (See Fig. 4). The shaft 36 carries two bevel gear wheels 37, each of which meshes with a bevel gear wheel 38 on the longitudinal shafts 39. The shafts 39 are arranged at opposite sides of the machine, and each of them carries a worm 40, which meshes with a worm wheel 41 on the table 3, these worm wheels providing means for the rotation of the table and gear blank. The shaft 39 at one side of the machine also carries a worm 42, which meshes with a worm wheel 43 having attached thereto a gear wheel 44 on the stub shaft 45 which meshes with a gear wheel 46. The gear wheel 46 has an attached gear 47, which meshes with a gear 48 having an attached gear 49, which in turn drives a pinion 50 on the worm shaft 29 before referred to. The gear 46 is mounted on the transverse shaft 51, carrying a bevel pinion 52, which meshes with a bevel pinion 54 on the longitudinal shaft 55 having a threaded portion 56, which engages a nut 57 on the carriage 5. The shaft 51 also has a bevel pinion 58 meshing with a bevel pinion 59 on the feed shaft or screw 14 before referred to. Said shaft 51, through the shaft 55, forms the means for feeding the blank longitudinally of the machine, and also the driving shaft for feeding the cutter or hob carrier. The two pinions 52 and 58 are loosely mounted on the shaft 51, and are arranged to be alternately connected therewith by means of a sliding clutch hub 60, which is engaged by a pivoted shifting arm 61. The gear 47 is carried by a sleeve shaft 62, which is arranged to be clutched to the shaft 51 by the sliding clutch member 63, engaged by a shifting lever 64. The two shifting levers 61 and 64 are connected by a link 65.

66 is an operating lever for the shifting levers.

67 is a shipping rod having an adjustable collar 68, which is arranged to be engaged by the carriage 5. This shipping rod also has the connected member 67ª provided with an adjustable collar 69 with a projecting finger 70 adapted to be engaged by the slide or carrier 11.

The operation is as follows:—The gear blank having been secured in place on the table 3, and the hobs 7 and 8 adjusted to a distance apart suitable to the width of face of the gear to be cut, the machine is set in motion causing the hobs and the blank to revolve at their relative speeds, i. e., at the precise ratio which the number of threads in each hob bears to the number of teeth to be cut in the blank. The lever 66 is now operated to throw the clutch member 60 into engagement with the bevel pinion 52. The shaft 56 is thus put into operation to feed the blank forwardly into cutting operation with the hobs, and this is allowed to proceed until the required depth of cut is reached. The upper hob 7 is set to cut slightly below the center line on the edge of the blank, and the hob 8 to cut approximately at the peripheral center of the blank. When the blank has been fed, and the cutting operation has progressed until the required depth of cut is reached, the carriage 5 will strike the collar 68 and operate the shipping rod 67 connected to the lever 66 to throw the clutch member 60 into the central position shown in Fig. 5. A further and more exact adjustment of the depth of cut may be effected by means of the hard wheel 71. The lever 66 is then moved by hand to throw the clutch member 60 into engagement with the pinion 58, thus setting in operation the vertical feed through the gear 59 and the screw 14. At the same time the clutch member 63 is thrown into engagement with the clutch hub of the sleeve shaft 62, thereby starting the gear 47 into action, and through the gears 48 and 49 actuating the shaft 29 carrying the worms 28, thereby causing the speed of the upper portions of shafts 18 and 21 to be varied, more or less, from the speed of the lower portion of said shafts, through the differential gearing 24, 25 and 26. It will be seen that the gear 47 and the gears which are driven therefrom, up to and including the planetary gears, do not become operative until the feed screw 14 is set in motion, but that it is essential to the production of correctly formed teeth that they operate simultaneously with feed screw 14.

It will readily be understood that by the use of change gears at a suitable point in the train of gearing described, that both the rate of feed of the feed screw 14, and also the time relation between the feed and the differential gearing may be varied. Thus, in the arrangement of gearing which I have shown by making the gear wheels 44 and 46 change gears, the rate of feed of the shaft or screw 14 may be varied; while by changing the gears 48 and 49, the time relation between the feed and the differential gearing may be changed.

In order to enable the completion on the one machine of the double helical gears described and claimed in my patent above referred to, in which the meeting portions or apices of the connecting portions of the two sets of teeth are removed, I provide the machine with the attachment now to be described. On the shaft 23 is a bevel gear wheel 72, which meshes with the bevel gear 73 on the longitudinal shaft 74. At its opposite end portion this shaft carries a bevel gear 75, meshing with the bevel gear wheel 76 on a vertical shaft 77. The shaft 77 carries a worm 78 meshing with the worm wheel 79 on a transverse cutter shaft 80 provided with a hob cutter 81, said shaft being inclined so as to bring the teeth of the cutter 81 into a position to cut in a line substantially parallel to the axis of the blank. After the hobs or cutters 7 and 8 have completed their work, the gear 72 may be put in operation to actuate the cutter 21 to thereby remove the apices of the connecting portions of the two sets of teeth. The cutter shaft 80, together with its actuating gearing is mounted on the movable tail block 82 which can be moved toward and away from the table 3 by any usual adjusting means. The bearings for the shaft 80 are carried by a vertically movable block 83, having an adjusting screw 84; and the worm 78 is vertically movable on its shaft 77 to suit the vertical adjustment given the shaft 80.

The machine described enables the teeth of double helical gears of varying sizes to be accurately cut with comparative rapidity in the face of a solid blank, the two sets or portions of the teeth being simultaneously formed.

I do not wish to limit myself to the details of the machine as herein shown and described, since I believe that I am the first to provide a machine of this character having two hobs or cutters arranged to act simultaneously upon the work and both feeding in the same direction, preferably downward, or toward the frame of the machine, as thereby greater solidity and higher cutting speeds are obtainable.

While I prefer to mount both of the cutters on a single slide or carrier, it will be obvious that this is not necessarily essential to my invention, since the two hobs or cutters may be mounted in various ways. I also believe that it is broadly new to provide a machine having hobs or cutters working in the manner described with means for driving the two cutters at relatively different speeds, the speed of one cutter being greater, while the speed of the other cutter is slower than the speed ratio of the cutters and the gear being cut. It will be obvious that machines embodying these essential features may differ widely in construction from the particular machine herein shown and described.

What I claim is:—

1. In a machine for cutting gears, a pair of rotary hobs mounted on separate axes and arranged to act upon a continuously revolving gear blank, and means for feeding both hobs in the same direction and in a line parallel to the axis of the blank; substantially as described.

2. In a machine for cutting gears, two hobs revolving in opposite directions arranged to act upon a continuously revolving gear blank, and means for simultaneously feeding both hobs or cutters in the same direction; together with means for affecting said hobs to cause them to produce cuts which are at reverse angles to their line of feed; substantially as described.

3. In a machine for cutting gears, a right-hand and a left-hand hob, means for revolving said hobs in opposite directions, and means for feeding them in the same direction, said hobs being arranged to act simultaneously upon a continuously revolving gear blank; substantially as described.

4. In a machine for cutting double helical gears, the combination with a blank support, and means for continuously rotating said support, a tool carrier having two simultaneously movable tools mounted thereon, one of said tools being arranged to cut from one edge of a blank toward its center, and the other tool to make a simultaneous cut from the center toward the opposite edge, and means for actuating the carrier and tools; substantially as described.

5. In a machine for forming double helical gears, two rotary cutters, means for feeding said cutters in the same direction, and means for driving the cutters at relatively different speeds; substantially as described.

6. In a machine for forming helical gears, a rotary blank carrier, a tool carrier movable in a direction parallel to the axis of the blank, and two cutters mounted on said carrier and arranged to act simultaneously upon different portions of the blank; substantially as described.

7. In a machine for forming helical gears, a rotary blank carrier, a tool carrier movable in a direction parallel to the axis of the blank, two cutters mounted on said carrier and arranged to act simultaneously upon different portions of the blank, together with means for varying the relative speeds of rotation of the two cutters; substantially as described.

8. In a machine for forming double helical gears, a rotary blank carrier, a tool carrier, means for feeding said carrier in a line substantially parallel to the axis of the blank to be cut, a pair of cutters mounted on said carrier to move in unison therewith, and gearing for rotating the blank carrier and also for actuating the cutters, said gearing having means for rotating one of the cutters at a rate of speed relatively slower than the speed ratio of the cutters and gear being cut and for rotating the other cutter at a rate of speed relatively faster than the speed ratio of the cutters and gear being cut; substantially as described.

9. In a machine for forming double helical gears, a rotary blank carrier, a cutter slide or carrier mounted for movement in a direction substantially parallel to the axis of the blank, two cutters mounted on said slide to move in unison therewith, gearing for feeding said slide, and gearing for driving the cutters at different rates of speed; substantially as described.

10. In a machine for forming double helical gears, a rotary blank carrier, a cutter slide or carrier mounted for movement in a direction substantially parallel to the axis of the blank, two cutters mounted on said slide to move in unison therewith, gearing for feeding said slide, and gearing for driving the cutters at different rates of speed, together with means for varying the feeding movement of the cutter slide; substantially as described.

11. In a machine for forming double helical gears, a rotary blank carrier, a cutter slide or carrier mounted for movement in a direction substantially parallel to the axis of the blank, two cutters mounted on said slide to move in unison therewith, gearing for feeding said slide, and gearing for driving the cutters at different rates of speed, said gearing having means for varying the relative speeds of the two cutters; substantially as described.

12. In a machine for forming double helical gears, a rotary blank carrier, a cutter slide or carrier mounted for movement in a direction substantially parallel to the axis of the blank, two cutters mounted on said slide to move in unison therewith, gearing for feeding said slide, and gearing for driving the cutters at different rates of speed, said gearing having means for varying the feed of the slide and for changing the gear relation between the said feed and the cutter driving gear; substantially as described.

13. In a machine for forming double helical gears, a rotary blank carrier, gearing for actuating the same, a cutter slide, a pair of cutters carried by said slide and arranged to feed in a line substantially parallel to the axis of the gear blank to be cut, means for varying the relative speeds of the two cutters, and means for moving the blank carrier toward and away from the cutter slide; substantially as described.

14. In a machine for forming double helical gears, a blank carrier, a pair of cutters arranged to act upon different portions of the blank, means for feeding both of said cutters in the same direction in a line substantially parallel to the axis of the blank, and another cutter arranged to act upon portions of the teeth formed by the said cutters; substantially as described.

15. In a machine for cutting gears, two rotary cutters, means for feeding said cutters in the same direction, a blank support, and means for effecting a relative feeding movement of the support and cutters in a direction substantially perpendicular to the first-named feed together with means for affecting said cutters to cause them to produce cuts which are at reverse angles to their line of feed; substantially as described.

16. In a machine for forming double helical gears, two hobs, means for feeding said hobs in the same direction, and means for affecting said hobs to cause them to produce cuts which are at reverse angles to their line of feed; substantially as described.

In testimony whereof, I have hereunto set my hand.

THOS. FAWCUS.

Witnesses:
   H. M. CORWIN,
   GEO. H. PARMELEE.